May 17, 1949.　　　　R. L. McHATTON　　　　2,470,180
CARBONACEOUS DEODORIZER AND PROCESS OF MAKING SAME
Filed Oct. 2, 1945
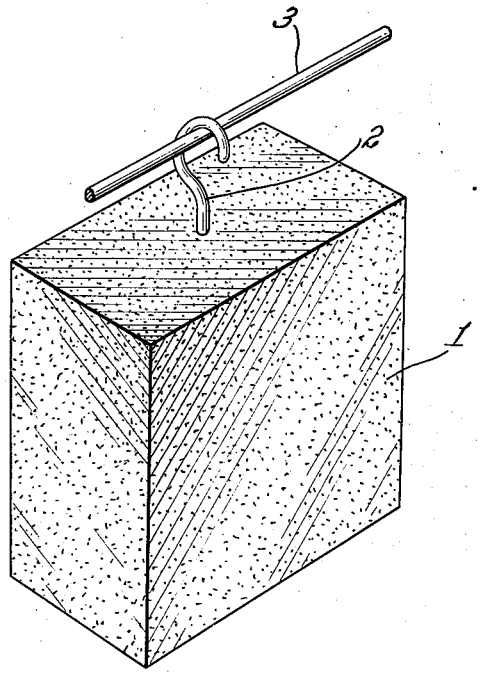
INVENTOR.
Rex L. McHatton
BY
Eugene M. Giles
Att'y.

Patented May 17, 1949

2,470,180

UNITED STATES PATENT OFFICE 2,470,180

CARBONACEOUS DEODORIZER AND PROCESS OF MAKING SAME

Rex L. McHatton, South Bend, Ind.

Application October 2, 1945, Serial No. 619,878

3 Claims. (Cl. 252—427)

My invention relates to deodorizers for use in refrigerators or similar places and has reference more particularly to a molded deodorizer of high receptivity to odors.

Heretofore in deodorizers, to obtain high receptivity to orders it has been customary to enclose the deodorizing material loosely in an air permeable container, usually mixed with some other material such as pebbles or the like to keep the particles of deodorizing material in loosely separated relation. Molded deodorizers have been employed in which sawdust is converted, after molding, to charcoal, but the charcoal is not uniform throughout the molded mass nor of a quality highly receptive to odors.

I have found, however, that a molded deodorizer may be made of high receptivity to odors with the deodorizer material uniformly distributed throughout the mass and with a penetrability to odors that insures susceptivity to odor throughout. Moreover, the deodorizer may be readily made by a simple molding operation in any desired form, and when it becomes saturated after continued use, its deodorizing effectiveness may be restored merely by heating.

The principal objects of my invention are, to provide a deodorizer of high receptivity to odors in a conveniently usable form; to insure uniformity of deodorizing characteristics and such penetrability that the deodorizer is susceptible to odors throughout; to facilitate the manufacture of deodorizers in a conveniently usable form; and in general to provide a simple convenient, effective and inexpensive deodorizer in which the deodorizing characteristics may be readily restored whenever depleted — these and other objects being accomplished as more fully pointed out hereinafter and as shown in the accompanying drawing in which the single figure thereof is illustrative of a convenient form in which the deodorizer may be made for suspending in a refrigerator or the like.

In making my deodorizer activated charcoal is employed as the deodorizing material, such charcoal being produced by heating regular charcoal to a temperature of 900° F., and powdered activated charcoal is employed, rather than granular, as the latter does not give as good results.

This powdered activated charcoal is mixed with sawdust and plaster of Paris in the following proportions by volume:

Activated charcoal _____ 2
Sawdust _____ 3
Plaster of Paris _____ 3 and to this mixture sufficient water is added to produce a paste of suitable consistency for pouring into molds, the materials being thoroughly mixed to insure uniform distribution.

The paste, thus prepared is then poured into suitable molds of the shape and size in which the deodorizer is to be made and allowed to stand until the material sets up, which occurs in about 20 minutes. The set up deodorizers are then removed from the molds, which are preferably of a type which may be taken apart or otherwise relaxed to free the molded deodorizer readily therefrom, after which the thus molded deodorizers are dried in an oven for approximately 72 hours.

This drying is accomplished in three stages at different temperatures, namely, for 24 hours at 100° F. then at 125° F. for 24 hours and then at 150° F. for 24 hours, after which the surfaces are buffed and the deodorizers then are ready for use. The deodorizer thus produced is of a solidified permanent form but has such odor permeability that the odors readily penetrate throughout the mass.

These deodorizers may be made in any desired form or size, for example, in flat slabs with hooks by which they may be hung flatwise under and close to the usual wire refrigerator shelf or they may be made with ribbed sides or otherwise to increase the surface area.

I have found, however, that for use in the ordinary household refrigerator a block form such as illustrated at 1 in the accompanying drawing is quite satisfactory and entirely acceptable. Such deodorizer is preferably made about 1¼ inches thick, 2¼ inches wide and 2½ inches high with a hook 2 extending upwardly from the top for suspending the deodorizer from a wire 3 of the usual wire shelf with which refrigerators are commonly provided. To attach this hook 1, a hole is merely bored in the completed deodorizer and the threaded end of the hook screwed therein.

This size of deodorizer has been found to be of ample capacity for the ordinary household refrigerator and may be conveniently installed in the refrigerator where it will not interfere with the refrigerator use.

With this deodorizer the activated charcoal powder is uniformly distributed throughout the mass of the deodorizer, and the material sufficiently penetrable so that the odors permeate throughout the mass and a high degree of efficiency is assured.

In time the deodorizer becomes more or less saturated with odors, and its deodorizing properties are accordingly diminished, but its deodorizing properties may be restored by merely heating in an oven at 250° F. for 30 minutes. Thus, the deodorizer may be recharged and used indefinitely by merely heating from time to time.

While I have shown and described my invention in a preferred form, I am aware that various changes and modifications may be made therein without departing from the spirit of the invention, the scope of which is to be determined by the appended claims.

I claim:

1. A deodorizer consisting of a mixture of activated charcoal, sawdust, and plaster of Paris in proportions of approximately two parts, three parts and three parts by volume respectively, the charcoal serving as an absorbing agent, the sawdust serving as a filler and the plaster of Paris serving as a bonding agent by which said materials are combined into a solidified odor permeable mass.

2. A deodorizer consisting of a solidified mixture of activated charcoal, sawdust and plaster of Paris in proportions of approximately two parts, three parts and three parts by volume respectively, the component solids thereof being distributively arranged throughout the solidified mixture in conformity with the dispersal of said solids in a pourable mixture of water, charcoal, sawdust and plaster of Paris.

3. The method of making a deodorizer, which said method comprises mixing substantially two parts by volume of activated charcoal, three parts by volume of sawdust and three parts by volume of plaster of Paris with sufficient water to form a pourable, relatively quick setting mixture, then pouring the mixture into molds and permitting it to set up in the molds, and then slowly drying the set up contents of the molds.

REX L. McHATTON.

REFERENCES CITED

The following references are of record in the file of this patent:

UNITED STATES PATENTS

| Number | Name | Date |
|---|---|---|
| 8,081 | De Cavaillon | May 6, 1851 |
| 161,672 | Dubbs | Apr. 6, 1875 |
| 692,549 | Schanz | Feb. 4, 1902 |
| 1,728,656 | Brandley | Sept. 17, 1929 |
| 1,966,553 | Kropp | July 17, 1934 |
| 1,999,499 | Burgess | Apr. 30, 1935 |